United States Patent
Guy et al.

(10) Patent No.: US 6,843,917 B1
(45) Date of Patent: Jan. 18, 2005

(54) METHOD FOR SEPARATING IN AN AQUEOUS MEDIUM LANTHANIDES AND/ OR ACTINIDES BY COMBINED COMPLEXING-NANOFILTRATION, AND NOVEL COMPLEXING AGENTS THEREFOR

(75) Inventors: Alain Guy, Pontcarre (FR); Jacques Foos, Orsay (FR); Marc Lemaire, Villeurbanne (FR); Frederic Chitry, Villeurbanne (FR); Stephane Pellet-Rostaing, Villeurbanne (FR); Christel Gozzi, Lyons (FR)

(73) Assignees: Universite Claude Bernard Lyon 1, Villeurbanne Cedex (FR); CNAM (Conservatoire National des Arts et Metiers), Paris Cedex (FR)

( * ) Notice: Subject to any disclaimer, the term of this patent is extended or adjusted under 35 U.S.C. 154(b) by 358 days.

(21) Appl. No.: 09/926,620

(22) PCT Filed: May 29, 2000

(86) PCT No.: PCT/FR00/01461

§ 371 (c)(1),
(2), (4) Date: Feb. 4, 2002

(87) PCT Pub. No.: WO00/73521

PCT Pub. Date: Dec. 7, 2000

(30) Foreign Application Priority Data

May 27, 1999 (FR) .............................. 99 06902

(51) Int. Cl.$^7$ ............................................ B01D 11/00
(52) U.S. Cl. ...................... 210/638; 210/639; 210/651; 210/652; 562/433; 562/607
(58) Field of Search .................. 210/634, 638, 210/639, 643, 644, 649–654, 684, 688; 423/7–11, 20; 562/433, 435, 437, 438, 607; 588/1, 2, 6

(56) References Cited

U.S. PATENT DOCUMENTS

| | | | |
|---|---|---|---|
| 4,104,358 A | | 8/1978 | Minagawa et al. |
| 4,548,790 A | * | 10/1985 | Horwitz et al. ................ 423/9 |
| 5,078,986 A | | 1/1992 | Bosworth et al. |
| 5,087,440 A | | 2/1992 | Cacheris et al. |
| 5,476,591 A | * | 12/1995 | Green ........................ 210/638 |
| 5,489,736 A | * | 2/1996 | Brierley et al. ................ 588/1 |
| 5,550,160 A | | 8/1996 | Smith et al. |
| 5,679,852 A | * | 10/1997 | Platzek et al. .............. 564/138 |
| 5,766,478 A | * | 6/1998 | Smith et al. ................ 210/638 |
| 5,868,935 A | * | 2/1999 | Sirkar et al. ................ 210/643 |
| 5,925,254 A | | 7/1999 | Lemaire et al. |
| 6,274,713 B1 | * | 8/2001 | Sieving et al. ............. 530/402 |

FOREIGN PATENT DOCUMENTS

| | | |
|---|---|---|
| GB | 1193596 | 2/1969 |
| GB | 2229312 | 9/1990 |
| WO | 95/27681 | 10/1995 |
| WO | 98/47856 | 10/1998 |

* cited by examiner

Primary Examiner—Joseph Drodge
(74) Attorney, Agent, or Firm—Dennison, Schultz, Dougherty & MacDonald

(57) ABSTRACT

The invention relates to the separation of lanthanides and actinides by nanofiltration complexation. The object of the invention is to satisfy the existing need for a simple, efficient and economical technique for separating lanthanides and actinides. This object is achieved by a process consisting of using ligands of the polyamino acid type, such as EDTA or DTPA, for complexing lanthanides and/or actinides before separating them by nanofiltration. The invention further relates to novel polyamino acid ligands incorporating ligand structures additional to EDTA and DTPA. Application to the production of rare earths or nuclear waste processing, especially to recycling operations carried out on spent nuclear fuels is also discussed.

22 Claims, 5 Drawing Sheets

METHOD FOR SEPARATING IN AN AQUEOUS MEDIUM LANTHANIDES AND/OR ACTINIDES BY COMBINED COMPLEXING-NANOFILTRATION, AND NOVEL COMPLEXING AGENTS THEREFOR

This application is a filing under 35 USC 371 of PCT/FR00/01461 filed May 29, 2000.

FIELD OF THE INVENTION

The invention relates to the separation of rare earths, or lanthanides, and radioactive actinide elements.

In economic and industrial terms, the separation of lanthanides particularly concerns the extraction of lanthanides from the ores containing them, which themselves originate from the earth's crust. Furthermore, lanthanides and actinides are present in the radioactive effluents produced by nuclear combustion. The ability selectively to isolate lanthanides and actinides is therefore of crucial economic and industrial interest.

The present invention therefore relates to a process for separating lanthanides from one another and/or lanthanides from actinides and/or actinides from one another in an aqueous medium, said process being of the type involving complexation-nanofiltration techniques.

The present invention further relates to the application of such a process to the production of rare earths and to the reprocessing of spent nuclear fuel elements containing lanthanides and/or actinides.

The present invention is also a suitable vehicle for publishing novel selective complexing agents for lanthanides and actinides.

DESCRIPTION OF RELATED ART

The earth's crust contains 0.08% by weight of lanthanides. The relative abundance of lanthanides in ores, which can vary from 50% to 0.01%, makes it difficult to separate the various lanthanides from one another, all the more so because these elements have similar chemical properties. At the present time, the main processes for the production of rare earths involve the hydrometallurgical treatment of enriched ores. These treatments comprise the following steps:

attacking the ores by a wet process;

separating and purifying the solutions obtained by employing selective precipitation techniques [in the case of rare earths with an oxidation state other than (III)] and sometimes ion exchange techniques on resin, but mainly solvent extraction techniques; and obtaining the finished products (oxides, various salts) or producing metals by the electrolysis of molten salts at high temperature or by metallothermics.

By virtue of their particular electronic structure, rare earths have a large variety of industrial applications: metallurgy, catalysis, glass, optics, ceramics, electronics, etc.

Actinides derive from the nuclear industry. The potential noxiousness in the long term (more than three centuries) of nuclear waste originating from the processing-recycling operations carried out on the fuels from electrogenic reactors is principally due to the presence of long-lived radionuclides of the elements neptunium ($^{237}$Np), americium ($^{241-243}$Am) and curium ($^{243-245}$Cm); these are called minor actinides as distinct from the major actinides uranium and plutonium, which are recycled into the manufacture of new fuels.

High-activity nuclear effluents contain minor actinides and lanthanides in oxidation state (III). The lanthanides constitute about one third of the fission products and are much more abundant than the minor actinides (=3–5% w/w, based on the lanthanides). It is therefore necessary to separate them in the knowledge that the choice not to generate secondary solid waste means selecting, as chemical reagents for the novel processes, only substances consisting solely of carbon (C), hydrogen (H), oxygen (O) and nitrogen (N), i.e. substances degradable to gases which can be discharged into the environment when these reagents reach the end of their life in the processes.

The extraction and separation of the minor actinides, and more particularly Am and Cm, in spent nuclear fuel effluents containing fission products rich in rare earths therefore presents a major technological challenge.

Following the example of the separation techniques currently employed in the production of rare earths from ores, precipitation or liquid-liquid extraction techniques are used to isolate the minor actinides from radioactive effluents rich in lanthanides. These precipitation or liquid-liquid extraction techniques have the major disadvantage of generating waste which then has to be processed. This complicates the processes considerably and burdens them with a severe economic handicap.

It is also known to separate the sodium, especially from the cesium, in aqueous effluents originating from the reprocessing of spent nuclear fuel elements. This forms the subject of French patent no. 2 731 831. The process according to said patent consists in reacting the radioactive aqueous effluents containing sodium, among other radioactive elements, with complexing agents such as ethylenediaminetetraacetic acid (EDTA), polyacrylic acids, polyvinylsulfonic acids, salts of these polyacids, a polyethylene-imine or a calixarene of the tetramethylcalix[4]resorcinolarene type. The effluents treated in this way are then subjected to nanofiltration on a membrane made of perfluorinated ionomer, polyaramide or porous alumina coated with a layer of sulfonated polysulfone. For the nanofiltration, a pressure varying from 0.25 to 1.5 MPa is applied to the effluent. The treated effluents contain sodium ions, strontium ions and $UO_2^{++}$ ions.

With EDTA (Example 7), strontium appears to be the most abundant element in the retentate, followed by sodium and cesium. Said document does not deal with the separation of lanthanides or actinides from one another, or lanthanides and actinides.

French patent no. 2 751 336 discloses linear polyphenols used as complexing agents in processes of the complexation-nanofiltration type for separating sodium from cesium in aqueous effluents originating from the reprocessing of spent nuclear fuel elements. Here again, said document does not deal with the separation of rare earths and actinides.

The article by GAUBERT et al. published in Sep. Science et Techno., 32(14), 2309–2320, 1997, relates to the separation of cesium from radioactive effluents by complexation-nanofiltration using a complexing agent of the resorcinarene type.

One is therefore obliged to note that no process is currently available for the separation of lanthanides and/or actinides by complexation-nanofiltration.

Furthermore, as regards rare earths and minor actinides, it should be emphasized that the industrial protagonists of the technical field in question are still waiting for a simple, economic, selective and efficient separation process.

SUMMARY OF THE INVENTION

In this context, one of the essential objects of the present invention is to provide a process for separating lanthanides from one another and/or lanthanides from actinides and/or actinides from one another in an aqueous medium, said process being capable of satisfying the existing need and overcoming the disadvantages of the separation techniques involving precipitation or liquid—liquid extraction.

Another essential object of the present invention is to provide a process for separating lanthanides or actinides from one another and/or lanthanides from actinides, said process being applicable to the production of rare earths as well as to the reprocessing of nuclear waste, especially that originating from the processing-recycling operations carried out on spent radioactive nuclear fuels, and particularly that containing on the one hand long-lived radionuclides, i.e. minor actinides, and on the other hand rare earths.

Another essential object of the invention is to provide novel complexing agents which can be used in separation processes involving complexation-nanofiltration.

DETAILED DESCRIPTION OF THE INVENTION

These and other objects are achieved by the present invention, which relates first and foremost to a process for separating lanthanides from one another and/or lanthanides from actinides and/or actinides from one another and/or from other transition metals in an aqueous medium, characterized in that it comprises the following essential steps:

1—treatment of the aqueous medium with at least one ligand selected from the group comprising ethylenediaminetetraacetic acid (EDTA) and/or linear or cyclic polyamino acids, preferably linear polyamino acids of formula (I) below:

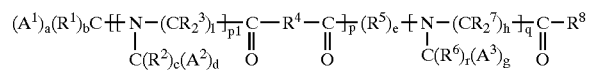

(I)

in which:
a=0 or 1 and b=2 or 3;
c=2 or 3 and d=0 or 1;
p=0 to 3, preferably 2;
p1=1 to 4, preferably 2 or 3;
e=0 or 1;
q=1 to 4, preferably 2 or 3;
f=2 or 3 and g=0 or 1;
h and i, which are identical or different, are each 1, 2 or 3, preferably 1 or 2;
$A^1$, $A^2$ and $A^3$ are identical to or different from one another and correspond to a monovalent acid group preferably selected from the group comprising:
—COOR, —$PO_3R'$ and —$SO_3R''$,
where R, R', R''=H or a cation;
the radicals $R_1$ are identical to or different from one another and correspond to:
Δ H,
Δ $C_1$–$C_{10}$ alkyl or

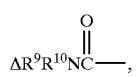

where a=0 and $R^9$ and $R^{10}$ are identical or different and each correspond to hydrogen or a hydrophilic monovalent radical preferably selected from amino and/or (poly)hydroxylated and/or alkoxylated and/or (poly)etherified hydrocarbon radicals, these radicals preferably being of the (cyclo)alkyl, aralkyl, alkylaryl, (cyclo)alkenyl, aralkenyl, alkenylaryl or aryl type, $R^9$ and $R^{10}$ each corresponding even more preferably to a $C_1$–$C_{10}$ hydroxy-alkyl, a $C_1$–$C_{10}$ alkoxy or a polyol, advantageously a hydrogenated saccharide;

the radicals $R^2$ are identical to or different from one another;
the radicals $R^3$ are identical to or different from one another;
the radicals $R^6$ are identical to or different from one another,
the radicals $R^7$ are identical to or different from one another,
$R^2$, $R^3$, $R^6$ and $R^7$ being identical to or different from one another and corresponding to H or a $C_1$–$C_{10}$ alkyl;
the radicals $R^4$ are identical to or different from one another and correspond to a hydrophilic divalent group preferably selected from aromatic amino and/or hydroxylated groups, aromatic and alkyl amino and/or hydroxylated groups, aromatic and (cyclo)alkylenic amino and/or hydroxylated groups and (cyclo)alkylenic amino and/or hydroxylated groups,
it being possible for this group to contain alkoxy and/or (poly)ether radicals,
$R^4$ preferably being a group

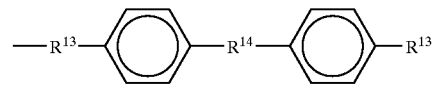

where $R^{13}$ is an amino group and $R^{14}$ is a $C_1$–$C_4$ alkylene;
the divalent group $R^5$ is an alkylene, preferably $CH_2$, or a group having the same definition as $R^4$; or
the group $R^8$ corresponds to a hydroxyl, to $A^4$ having the same definition as $A^1$, $A^2$ and $A^3$, to hydrogen or to —$NR^9R^{10}$, where $R^9$ and $R^{10}$ are identical to or different from one another and are a hydrophilic monovalent radical preferably selected from amino and/or (poly)hydroxylated and/or alkoxylated and/or (poly) etherified hydrocarbon radicals, these radicals preferably being of the (cyclo)alkyl, aralkyl, alkylaryl, (cyclo)alkenyl, aralkenyl, alkenylaryl or aryl type,
$R^8$ even more preferably being a $C_1$–$C_{10}$ hydroxyalkyl, a $C_1$–$C_{10}$ alkoxy or a polyol, advantageously a hydrogenated saccharide;

2—(nano)filtration of the aqueous solution treated with the ligand (I), under a transmembrane pressure greater than or equal to 0.01 MPa, preferably greater than or equal to 0.1 MPa and even more preferably of between 0.2 and 1.0 MPa, so as to collect on the one hand a retentate enriched in at least one species of lanthanide, actinide or other transition metal, this species being that which is at least partially complexed with the ligand (I), and on the other hand a permeate impoverished in said species; and optionally 3—recovery of the ligand/species complexes to be separated in the retentate, and treatment of these complexes with one or more appropriate decomplexing agents so as to collect on the one hand the ligands and on the other hand the target species.

The process according to the invention derives from the combination of a process for the selective complexation of actinides and/or lanthanides with a membrane separation process and more particularly a [nano]filtration process.

It is self-evident that the process according to the invention is not limited to [nano]filtration in the strict sense, but encompasses any membrane separation technique which employs a semipermeable membrane forming a barrier between two homogeneous media and offering an unequal resistance to the passage of different constituents of a fluid (suspension, solution, solvent). The force which enables some of said constituents to pass through the barrier can result from a pressure gradient (microfiltration, ultrafiltration, nanofiltration, reverse osmosis), a concentration gradient (dialysis) or an electrical potential gradient (electrodialysis).

The essential advantages of the process according to the invention are its simplicity of implementation, its economic features, its selectivity and the fact that it does not generate secondary solid waste which would incur expensive reprocessing. In fact, this process only employs substances consisting solely of carbon, hydrogen, oxygen and nitrogen. Such organic substances are easily degradable to inoffensive gases which can be discharged without adverse environmental repercussions.

It has been possible to achieve these advantageous results by virtue of the inventors' worthy and judicious selection of a specific class of ligands which are capable of complexing lanthanides and actinides or other transition metals and whose complexing powers towards various lanthanides and actinides or other transition metals are sufficiently different to allow a good separation of each of these species from the others.

The selected ligands/complexing agents are linear or cyclic polyamino acids, preferably linear polyamino acids, including the well-known complexing agents ethylenediaminetetraacetic acid (EDTA) and diethylenetriaminepentaacetic acid (DTPA).

In an advantageous mode of implementation of the invention, to separate two lanthanides or two actinides or a lanthanide and an actinide or other transition metals in an aqueous medium, preferably an aqueous solution, one or more ions of the metal(s), lanthanides or actinides to be separated are subjected to selective complexation.

It is clear that the complexes of ligand/species to be separated which have the greatest mass and the greatest steric bulk are those which have the most difficulty in passing through the nanofiltration membrane under the effect of the pressure difference prevailing on either side of this membrane. The non-complexed ions pass through the membrane easily and are therefore separated from the complexed ions in a single step and without the use of a solvent.

In step 3, if performed, the complexed ions can be freed or decomplexed after filtration, for example in a basic medium, by precipitation of their hydroxides or by passage over a specific ion exchange resin. Within the framework of this step 3, it is advantageous according to the invention to make provision for removal of the solvent—in this case water—for example by evaporation, in order to enable the separated ions to be recovered.

The equipment needed to carry out the process according to the invention is relatively limited, the only requirements being a complexation reactor, a pump and a nanofiltration membrane.

To optimize the separation, it is preferable to ensure that there is a large difference between the complexation constants of the lanthanides/actinides with the ligands of the linear or cyclic polyamino acid type. This affords a very selective complexation and hence a very effective separation.

According to a preferred characteristic of the invention, the ligands/complexing agents are linear polyamino acids of formula (I) given above. All the monovalent or divalent groups or radicals referred to in said formula (I) can be linear or branched alkyls or alkenyls whose chain can contain one or more oxygen atoms in place of the carbon atoms (e.g. alkoxy or (poly)ether).

In this same formula (I), "aryl" group is understood as meaning a group derived from an aromatic hydrocarbon unit containing one or more aromatic rings and capable of being unsubstituted or substituted by OH, alkyl or hydroxyalkyl groups by the removal of a hydrogen atom carbon of the ring or by removal of a hydrogen atom from one of the carbons of an alkyl or hydroxyalkyl substituent. Examples which may be mentioned are benzyl alcohol groups or hydroxyalkyl-phenol groups.

Also in this formula (I), "cycloalkylene" group is understood as meaning a divalent group derived from a cyclic hydrocarbon which is unsubstituted or substituted by alkyl or hydroxyalkyl chains by removal of a hydrogen atom, a carbon atom of the ring. An example which may be mentioned is the cyclohexylene group.

"Hydrocarbon" is understood in terms of the invention as meaning any group containing especially carbon atoms and hydrogen atoms.

Where reference is made to $C_1$–$C_{10}$ alkyls, alkoxys or alkenyls, $C_2$, $C_3$ or $C_4$ radicals are more especially intended.

Advantageously, the hydrophilic groups which can correspond to $R^8$, $R^9$ or $R^{10}$ are polyhydroxyalkyls, preferably hydrogenated saccharides and even more preferably a sorbitol radical or polyether chains, preferably polyethylene glycol or polypropylene glycol.

Advantageously, this formula (I) encompasses the well-known linear polyamino acids EDTA and DTPA (p=0; q=2 or 3; b=2; f=2; e=0; $A_1$, $A_3$=COOH; $R^1$, $R^6$, $R^7$=H; $R^8$=OH).

In one variant, the ligands/complexing agents can be cyclic polyamino acids such as the DOTAs, which are cyclic polyaminocarboxylates.

One of the essential characteristics of the process according to the invention is the choice of ligands/complexing agents, especially those of formula (I), whose molecular weight is greater than the cut-off threshold of the nanofiltration membrane, thereby affording a complete retention of the complexed ions.

In a preferred mode of carrying out the invention, the ligand/complexing agent is a product of formula (I.1):

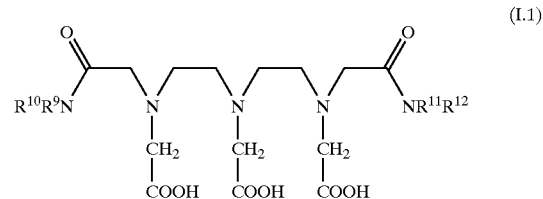

in which $R^9$, $R^{10}$, $R^{11}$ and $R^{12}$ are identical to or different from one another and are each a hydrophilic monovalent radical having the same definition as that given for $R^9$ and $R^{10}$, ethanoyl, methoxyethyl and sorbitoyl radicals being more especially preferred.

It is worth emphasizing that the process according to the invention makes it possible not only to separate a given species of lanthanide and/or actinide and/or other transition metal, but also several species of these metals. Thus, according to an advantageous provision of the invention, several metal species belonging to the lanthanide and/or actinide family are separated, said separation being effected by successive complexations of the ions of each of these species to be separated, the appropriate selective ligand being chosen for each species (step 1) and a nanofiltration (step 2) and a decomplexation/collection (step 3) being carried out after each complexation.

The (nano)filtration membranes usable in the process of the invention can be organic, inorganic or organo-inorganic. Their cut-off threshold must be such that they allow the non-complexed mono-, di-, tri- and tetravalent ions to pass through and retain the lanthanide or actinide ions complexed by the ligands of the invention. The cut-off threshold of a membrane in respect of a neutral solute can be defined as the minimum molecular weight of a compound which is necessary for a 90% retention rate of this compound.

According to the invention, the appropriate cut-off threshold for the selected membrane is defined as follows (in g/mol):

|                         |           |
|-------------------------|-----------|
|                         | 100–5000  |
| preferably              | 200–2000  |
| and even more preferably| 500–1500  |

In practice, the cut-off threshold can be e.g. between 200 and 2000 g/mol.

These nanofiltration membranes are advantageously made of at least one material selected from the group of polymers comprising:

polyaramides, sulfonated polysulfones, polybenzimidazolones, grafted or non-grafted polyvinylidene fluorides, polyamides, cellulose esters, cellulose ethers, perfluorinated ionomers, associations of these polymers, and copolymers obtained from monomers of at least two of these polymers.

For further details on nanofiltration membranes, reference may be made to international patent application PCT WO—92/06675, which describes organo-inorganic nanofiltration membranes comprising an active layer of a polymer of the polysulfonated, polybenzenimidazolone, grafted polyvinylidene fluoride or perfluorinated ionomer (Nafion®) type with a cut-off threshold of 300 to 1000 g.mol$^{-1}$. Reference is also made to French patent application no. 2 600 264, which relates to organo-inorganic membranes comprising an organic porous support and a microporous membrane made of an organic polymer such as a polysulfone, polyamide, cellulose ester or cellulose ether.

Examples which may be mentioned in particular of preferred membranes for carrying out the process of the invention are the membranes marketed by OSMONICS under the names SEPA MG-17, SEPA MW-15 and SEPA BQ-01, which have a permeability to double-distilled water of between 2 and 10 l.h$^{-1}$.m$^{-2}$.bar$^{-1}$ at 25° C.

The separation process on a nanofiltration membrane is preferably carried out using the tangential filtration technique; this limits the phenomenon of accumulation of the species retained on the surface of the membrane, because the circulation of the retentate causes a strong turbulence in the vicinity of the membrane. Furthermore, this type of filtration enables continuous use.

This can be done using modules in the form of parallel tubes or plates such as those conventionally employed in this technique. It is also possible to use modules in which flat membranes are wound in a spiral around a hollow perforated tube intended for collecting the permeate.

These modules can be in series and/or in parallel, optionally with different membranes in some of the modules.

The desired separation rates can be obtained by varying the treatment conditions, such as the pH of the aqueous solution to be treated, the pressure difference, the circulation rate of the retentate and the temperature used.

The pH of the aqueous solution is preferably in the range from 1 to 7 because lanthanide and actinide hydroxides precipitate when the pH is above 7.

The pH of the solutions to be treated can be adjusted by the addition of e.g. NaOH or HNO$_3$.

As far as the temperature is concerned, it is possible to operate at room temperature or at a lower or higher temperature, for example ranging from 10 to 40° C.

In the first step of this process, the water-soluble complexing agent consisting of the derivative of formula (I) is added to the aqueous solution to be treated. The amount of complexing agent added shall be greater than or equal to one equivalent of complexing agent per atom of lanthanide or actinide to be separated. These complexing agents form complexes of the 1:1 type.

For subsequent separation of the lanthanides and/or actinides, the aqueous solution to be treated is circulated in the vicinity of the nanofiltration membrane and a pressure difference is applied between the two opposite faces of the membrane in order to collect a permeate impoverished in lanthanide (or actinide) to be separated, and a retentate enriched in lanthanide (or actinide) to be separated. The pressure difference between the two opposite faces of the membrane can vary within limits, but good results are obtained with a pressure difference ranging from 0.2 to 0.8 MPa According to another of these features, the invention relates to novel complexing agents of the polyamino acid type of formula (1):

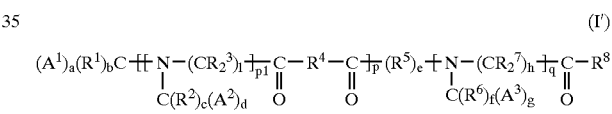

(I')

which:
a=0 or 1 and b=2 or 3;
c=2 or 3 and d=0 or 1;
p-=0 to 3, preferably 2;
p1=1 to 4, preferably 2 or 3;
e=0 or 1;
q=1 to 4, preferably 2 or 3;
f=2 or 3 and g=0 or 1;
h and i, which are identical or different, are each 1, 2 or 3, preferably 1 or 2;
$A^1$, $A^2$ and $A^3$ are identical to or different from one another and correspond to a monovalent acid group preferably selected from the group comprising:
—COOR, —PO$_3$R' and —SO$_3$R",
where R, R', R"=H or a cation;
the radicals R$_1$ are identical to or different from one another and correspond to:
Δ H,
Δ C$_1$–C$_{10}$ alkyl or

where a=0 and $R^9$ and $R^{10}$ are identical or different and each correspond to hydrogen or a hydrophilic monovalent radical preferably selected from amino and/or (poly)hydroxylated and/or alkoxylated and/or (poly)etherified hydrocarbon radicals, these radicals preferably being of the (cyclo)alkyl, aralkyl, alkylaryl, (cyclo)alkenyl, aralkenyl, alkenylaryl or aryl type,

- $R^9$ and $R^{10}$ each corresponding even more preferably to a $C_1$–$C_{10}$ hydroxy-alkyl, a $C_1$–$C_{10}$ alkoxy or a polyol, advantageously a hydrogenated saccharide;
- the radicals $R^2$ are identical to or different from one another;
- the radicals $R^3$ are identical to or different from one another;
- the radicals $R^6$ are identical to or different from one another;
- the radicals $R^7$ are identical to or different from one another,
- $R^2$, $R^3$, $R^6$ and $R^7$ being identical to or different from one another and corresponding to H or a $C_1$–$C_{10}$ alkyl;
- the radicals $R^4$ are identical to or different from one another and correspond to a hydrophilic divalent group preferably selected from aromatic amino and/or hydroxylated groups, aromatic and alkyl amino and/or hydroxylated groups, aromatic and (cyclo)alkylenic amino and/or hydroxylated groups and (cyclo)alkylenic amino and/or hydroxylated groups, it being possible for this group to contain alkoxy and/or (poly)ether radicals, $R^4$ preferably being a group

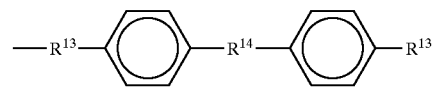

where $R^{13}$ is an amino group and $R^{14}$ is a $C_1$–$C_4$ alkylene;

- the divalent group $R^5$ is an alkylene, preferably $CH_2$, or a group having the same definition as $R^4$; or
- the group $R^8$ corresponds to a hydroxyl, to $A^4$ having the same definition as $A^1$, $A^2$ and $A^3$, to hydrogen or to $-NR^9R^{10}$, where $R^9$ and $R^{10}$ are identical to or different from one another and are a hydrophilic monovalent radical preferably selected from amino and/or (poly)hydroxylated and/or alkoxylated and/or (poly)etherified hydrocarbon radicals, these radicals preferably being of the (cyclo)alkyl, aralkyl, alkylaryl, (cyclo)alkenyl, aralkenyl, alkenylaryl or aryl type,
- $R^8$ even more preferably being a $C_1$–$C_{10}$ hydroxyalkyl, a $C_1$–$C_{10}$ alkoxy or a polyol, advantageously a hydrogenated saccharide, with the exception of EDTA and DTPA.

These EDTA and DTPA derivatives (I') have proved to be excellent complexing agents for lanthanides, actinides and transition metals.

These complexing agents (I') are water-soluble.

Even more preferably, the invention relates to the complexing agents of the following formulae:

(I'.1)

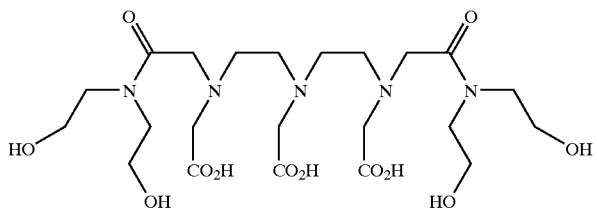

(I'.2)

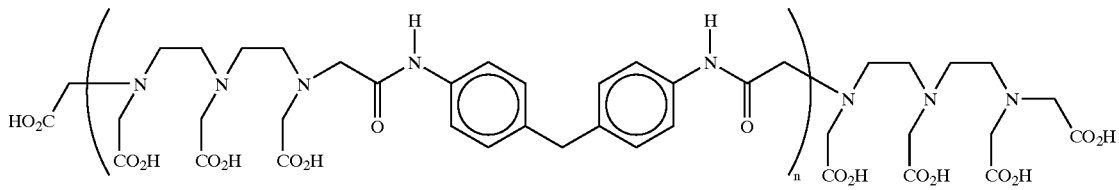

n being between 1 and 100, preferably between 1 and 10, (I'.3)

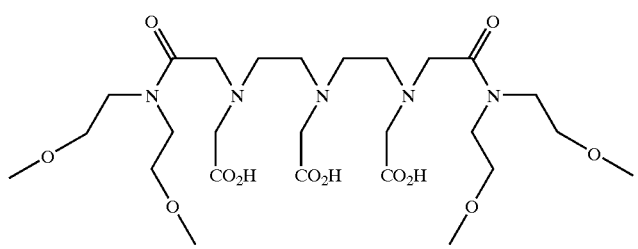

-continued

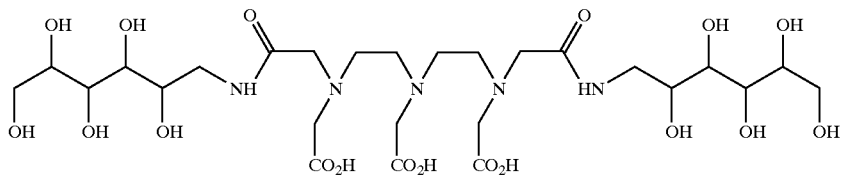

(I'.4)

Finally, the invention relates to the application of the process and the complexing agents (I)/(I'), as defined above, to the production of rare earths or to the processing of nuclear waste, especially that originating from the processing-recycling operations and spent nuclear fuel.

The invention will be understood more clearly from the following illustrative and non-limiting Examples describing a device for carrying out the process, syntheses of complexing agents/ligands and concrete cases of implementation of the process using these complexing agents.

EXAMPLES

BRIEF DESCRIPTION OF THE FIGURES

Reference is made hereafter to the attached drawings, in which.

BEST MODE OF CARRYING OUT THE INVENTION

Figure 1:
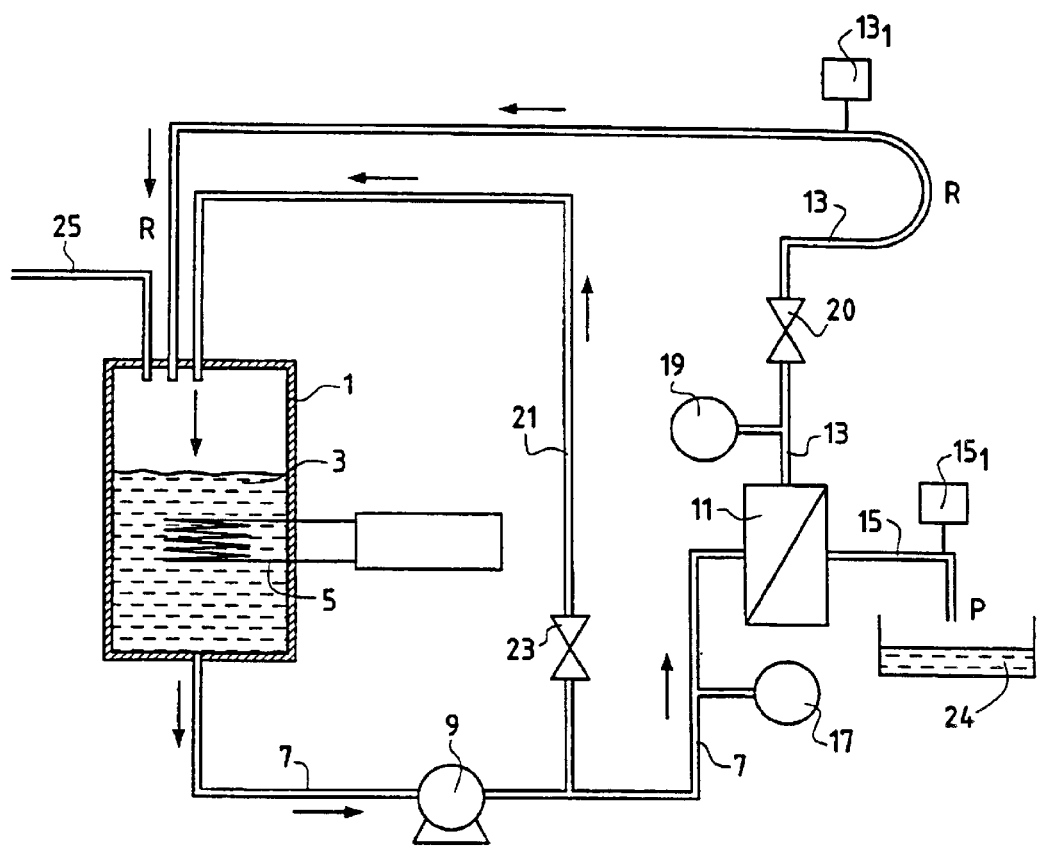
FIG. 1 is an illustration of the device for carrying out the separation process according to the invention.

FIG. 1 shows an installation of a tangential diafiltration module comprising a reservoir 1 containing the effluent (aqueous solution medium) 3 to be treated. This reservoir can be maintained at an appropriate temperature by a cryostat 5. The effluent to be treated is led from the reservoir 1 into the filtration module 11 via a line 7 equipped with a pump 9. On the one hand the retentate R and on the other hand the permeate P are withdrawn from this module 11 via the lines 13 and 15 respectively. The lines 13 and 15 lead R and P, respectively, into the reservoir 1 and a container 24. The lines 13 and 15 are respectively provided with a flowmeter 13, and with a conductivity meter and an electrode designated by the common reference 151. The lines 7 and 13 are equipped with manometers 17 and 19, respectively, and the line 13 is also equipped with a valve 20. A line 21, equipped with a valve 23, connects the part of the line 7 located downstream of the pump to the top of the reservoir 1. Provision is also made for a line 25 for feeding the reservoir 1 with water (devoid of species to be separated) as the permeate P becomes saturated in the container (24). This optimizes the filtration by recycling he retentate.

The membranes used in the filtration module 11 can be tubular membranes or spiral modules comprising two semi-permeable membranes wound in a spiral around a perforated hollow support tube delimiting a tube for collection of the permeate P. These two membranes are kept an appropriate distance apart by a spacer grid. The filtration membrane is a NANOMAX 5° in the present case.

In the process according to the invention, the complexing agent is added to the effluent 3, inside the reservoir 1, before starting the complexation/filtration process.

Example 1

SYNTHESIS OF DTPA BIS(DIETHANOL) AMIDE (1)

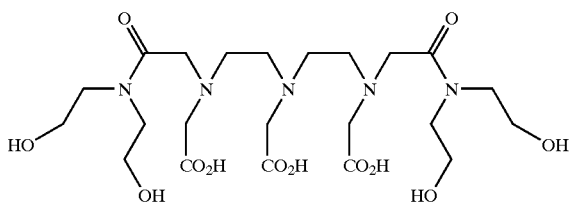

(1)

In a 500 ml three-necked flask, 10 grams of DTPA dianhydride (27.98 mmol) are dissolved in 150 ml of anhydrous DMF at 80° C. under an inert atmosphere (argon). 17 grams of diethanolamine (167.9 mmol) in 50 ml of DMF are added dropwise and the reaction medium is stirred for 48 hours. The oily residue obtained is separated from the solvent by decantation. After this residue has been dissolved in the minimum volume of water, 800 ml of acetone are added and the viscous precipitate is triturated, isolated from the solvent by decantation and purified on a column of Amberlite IR-120 ion exchange resin by elution with distilled water. 7.98 g of product (1) are obtained in the form of a white powder (50% yield) after evaporation and drying under vacuum.

$^1$H NMR ($D_2O$): 3.1 (t, J=6.25, 4H); 3.48–3.52 (t+s, 10H); 3.59 (t, J=6.2, 4H); 3.76 (t, J=5.2, 8H); 3.91 (s, 4H); 4.49 (s, 4H). $^{13}$C NMR ($D_2O$): 50.59, 55.88, 56.62, 58.84, 59.95 ($CH_2CO_2H$ and $NCH_2CH_2N$); 51.75, 52.14, 60.85, 61.2 ($N(CH_2CH_2OH)_2$); 169.02, 172.6, 176.8 ($CO_2H$ and CO). ES-MS: ES*: 566.3 ([M−H1]; 282.7 ([M−2H]$^{2-}$]).

Example 2

SYNTHESIS OF THE COPOLYMER DTPA/4,4'-METHYLENE-DIANILINE (2)

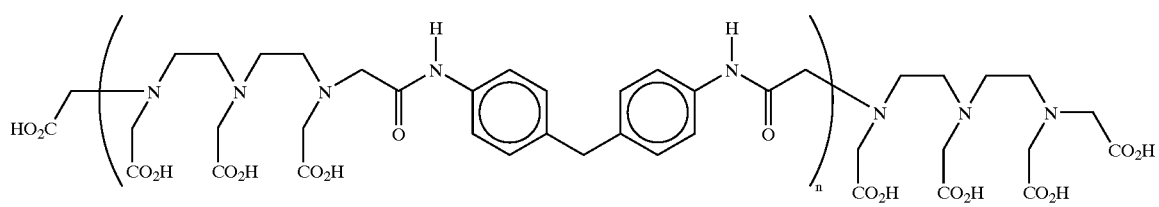

(2)

In a 250 ml three-necked flask, 1.179 grams of DTPA dianhydride (3.3 mmol) are dissolved in 120 ml of anhydrous DMF at 50° C. under an inert atmosphere (argon). 595 milligrams of 4,4'-methylenedianiline (3 mmol) in 45 ml of anhydrous DMF are added dropwise and the reaction medium is stirred for 4 hours at 50° C. The reaction mixture is run into 500 ml of diethyl ether. The precipitate is filtered off and washed with 3 times 100 ml of diethyl ether. 1.28 g of product (2) are obtained in the form of a white powder (72% yield) after drying under vacuum.

$^1$H NMR (D$_2$O): 7.17 (s broad, 2H); 6.76 (m, 2H); 3.3–2.1 (m, 14H).

Calculation of the degree of polymerization by $^1$H NMR:

R area of aromatic CH/area of aliphatic CH$_2$=0.296
n=−18R/(20R−8)=2.57

Example 3

SYNTHESIS OF DTPA BIS(DI(2-METHOXYETHYL)AMIDE) (3)

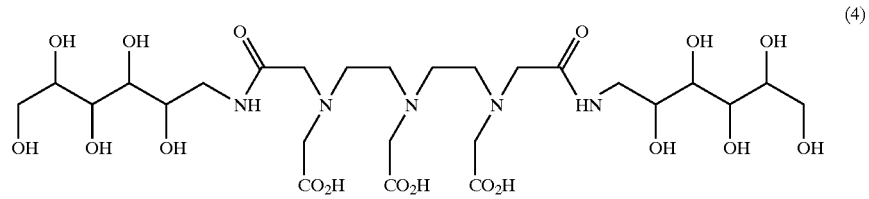

(3)

12.4 ml of bis(2-methoxyethyl)amine (0.084 mol) dissolved in 40 ml of anhydrous DMF are added dropwise to 5 grams of DTPA dianhydride (0.014 mol) dissolved in 80 ml of anhydrous DMF under argon at 80° C. The reaction medium is stirred for 24 hours. After concentration and the addition of diethyl ether, the oily precipitate is separated from the solvents by decantation. This residue is dissolved in the minimum volume of CHCl$_3$ and reprecipitated in Et$_2$O. A hygroscopic foam (3) (6.43 g, 74% yield) is obtained after drying under vacuum; it is used without further purification.

$^1$H NMR (D$_2$O+NaOD): 2.50 (t, 4H); 2.52 (t, 4H); 2.98 (s, 2H); 3.11 (s, 4H); 3.31 (s, 6H); 3.32 (s, 6H); 3.51 (s, 4H); 3.53–3.56 (m, 16H).

$^{13}$C NMR (D$_2$O): 45.94, 47.03, 47.81, 49.75, 53.69, 56.29, 57.78, 67.16, 69.56, 69.69 (CH$_2$); 58.63, 59.07 (OCH$_3$); 166.9, 170.5, 175.7 (CO$_2$H and CO).

ES-MS: ES$^-$: 622.1 ([M–H]); ES$^+$: 624.3 ([M+H]$^+$); 646.2 ([M+Na]$^+$).

Example 4

SYNTHESIS OF DTPA BIS(1-DEOXY-1-AMIDOSORBITOL) (4)

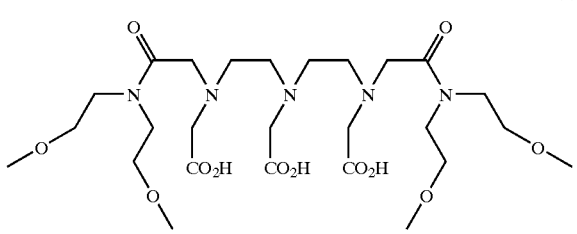

(4)

In a 500 ml three-necked flask, 5 grams of DTPA dianhydride (0.014 mol) are dissolved in 100 ml of anhydrous DMF at 70° C. under argon. 5.32 grams of 1-deoxyl-1-aminosorbitol (0.029 mol) dissolved in 40 ml of DMSO are added dropwise and the reaction medium is stirred for 24 hours. The viscous reaction residue is separated from the solvents after decantation. It is then dissolved in the minimum volume of water and reprecipitated by the addition of acetone. The operation is repeated a second time and the residual oil is separated off by decantation and dried under vacuum to give a slightly off-white foam (4) (6.66 g, 66% yield).

$^{13}$C NMR (D$_2$O): 42.17, 47.14, 49.61, 53.41, 56.73, 57.48, 63.16 (CH$_2$); 69.44, 71.08, 71.18, 71.38 (CH); 171.0, 178.86 (CO$_2$H and CO).

ES-MS: ES$^+$: 741.2 ([M+Na]$^+$).

Example 5

This Example deals with an aqueous solution containing 2 mmol/l of gadolinium (Gd) and 2 mmol/l of lanthanum (La) in the form of gadolinium and lanthanum nitrate hexahydrates. The filtration module used is a plano-spiral module equipped with the NANOMAX 50 membrane marketed by MILLIPORE, which has a surface area A of 0.4 m$^2$.

The NANOMAX 50 plano-spiral membrane has a permeability to double-distilled water of 10 $l.h^{-1}.m^{-2}.bar^{-1}$ at 25° C. A complexing agent consisting of DTPA is added to the aqueous solution to be treated.

The Gd/La separation is effected under the following conditions:

transmembrane pressure ΔP=0.5 MPa,
temperature=20° C.,
retentate flow rate=500 l/h,
[$NaNO_3$]=0.5 mol/l.

Several experiments are carried out with the complexing agent being added at concentrations varying from 0 to 2 equivalents of DTPA units per atom of gadolinium.

The retention rate is defined by the following formula:

$$RR=[(C_0-C_p)/C_0]\times 100$$

where $C_0$ represents the concentration of the element in the feed and $C_p$ represents the concentration of the element in the permeate.

Figure 2:
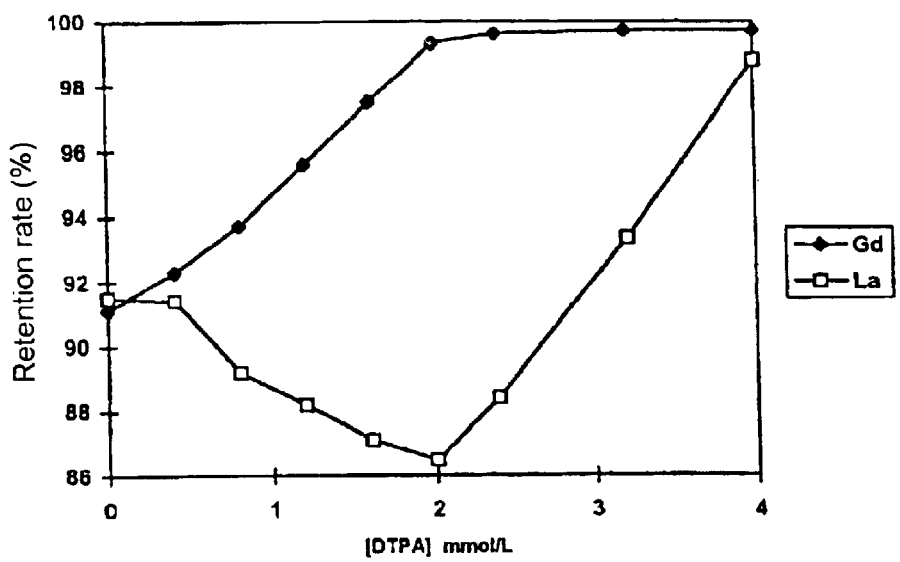
FIGS. 2, 4 and 5 are graphs of the retention rate in % as a function of the concentration of complexing agent.

The results of the experiments are given in FIG. 2.

The results in FIG. 2 show that the retention rate of gadolinium is greater than that of lanthanum when the solution contains between 0 and 2 equivalents of DTPA units per atom of gadolinium. The difference between the retention rate of gadolinium and that of lanthanum is a maximum when the ratio [complexing agent]/[gadolinium] is equal to 1. This difference then has a value of 14%.

Example 6

This Example deals with an aqueous solution containing 2 mmol/l of gadolinium (Gd) and 2 mmol/l of lanthanum (La) in the form of gadolinium and lanthanum nitrate hexahydrates. The filtration module used is a plano-spiral module equipped with the NANOMAX 50 membrane, which has a surface area A of 0.4 $m^2$. A complexing agent consisting of DTPA is added to the aqueous solution to be treated in an amount of 1.1 equivalents of DTPA units per atom of gadolinium.

The total volume of the solution to be filtered is 4 liters.

The filtration of the solution of Gd and La is effected under the following conditions:

transmembrane pressure ΔP=0.5 MPa,
temperature=20° C.,
retentate flow rate=500 l/h,
[$NaNO_3$]=0.5 mol/l,
pH=3.8.

This is a diafiltration experiment, i.e. the permeate is withdrawn from the reservoir containing the solution to be filtered, and an aqueous solution containing neither Gd nor La is added simultaneously to the solution to be treated. This configuration makes it possible to work with a constant volume in the reservoir containing the solution to be filtered.

Figure 3:
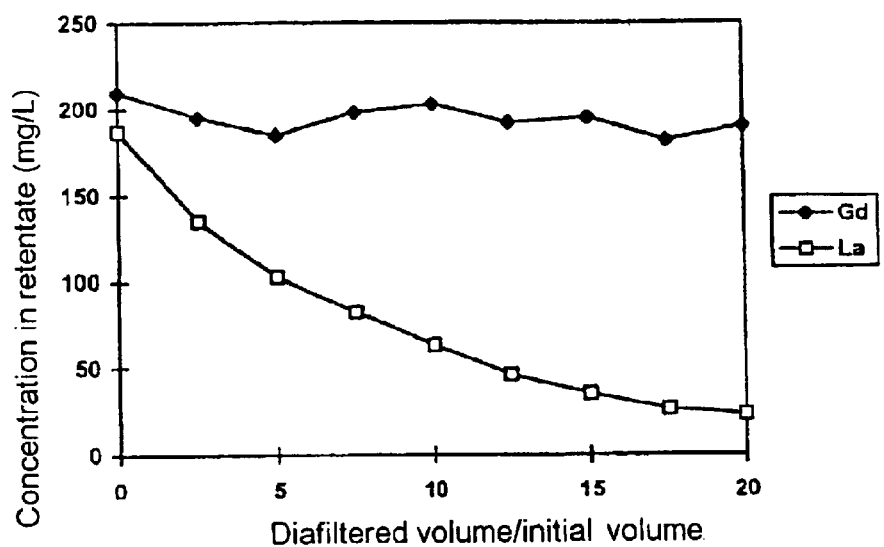
FIG. 3 is a graph of the concentration of Gd and La in the retentate as a function of the ratio diafiltered volume/initial volume.

The results of the experiments are given in FIG. 3.

The results in FIG. 3 show that the concentration of gadolinium in the retentate decreases much less rapidly than that of lanthanum. When this experiment has ended, i.e. when the ratio of the total volume diafiltered to the volume of retentate has reached a value of 20, 88% of the initial lanthanum and only 8% of the initial gadolinium have been removed.

Example 7

This Example deals with an aqueous solution containing 2 mmol/l of gadolinium (Gd) and 2 mmol/l of lanthanum (La) in the form of gadolinium and lanthanum nitrate hexahydrates. The filtration module used is a flat module equipped with the SEPA MQ-09 membrane (which has a surface area A of 0.015 $m^2$). The SEPA MQ-09 flat membrane has a permeability to double-distilled water of 4.5 $l.h^{-1}.m^{-2}.bar^{-1}$ at 25° C. A complexing agent consisting of (3) of Example 3 is added to the aqueous solution to be treated.

The Gd/La separation is effected under the following conditions;

transmembrane pressure ΔP=0.6 MPa,
temperature=20° C.,
retentate flow rate=80 l/h,
2<pH<4,
[$NaNO_3$]=0.2 mol/l.

Several experiments are carried out with the complexing agent being added at concentrations varying from 0 to 2 equivalents of complexing units (3) per atom of gadolinium.

Figure 4:
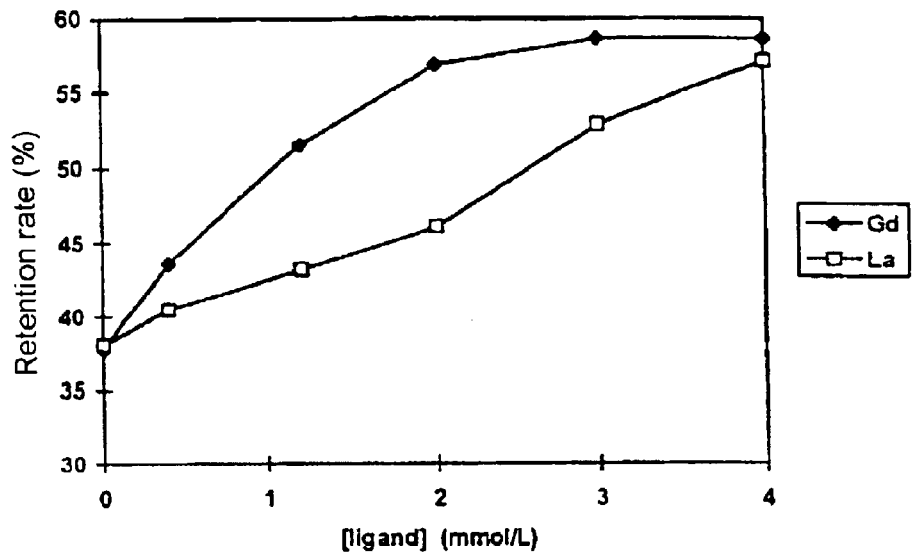

The results of the experiments are given in FIG. 4.

The results in FIG. 4 show that the retention rate of gadolinium is greater than that of lanthanum as soon as complexing agent (3) is added to the solution to be treated. The difference between the retention rate of gadolinium and that of lanthanum is a maximum when the ratio [complexing agent]/[gadolinium] is equal to 1. This difference then has a value of 11%.

Example 8

This Example deals with an aqueous solution containing 2 mmol/l of gadolinium (Gd) and 2 mmol/l of lanthanum (La) in the form of gadolinium and lanthanum nitrate hexahydrates. The filtration module used is a flat module equipped with the SEPA MQ-09 membrane (which has a surface area A of 0.015 $m^2$). The SEPA MQ-09 flat membrane has a permeability to double-distilled water of 4.5 $l.h^{-1}.m^{-2}.bar^{-1}$ at 25° C. A complexing agent consisting of (2) of Example 2 is added to the aqueous solution to be treated.

The Gd/La separation is effected under the following conditions:

transmembrane pressure ΔP=0.6 MPa,
temperature=20° C.,
retentate flow rate=80 l/h,
3<pH<5,
[$NaNO_3$]=0.1 mol/l.

Several experiments are carried out with the complexing agent being added at concentrations varying from 0 to 1.5 equivalents of complexing units (2) per atom of gadolinium.

Figure 5:
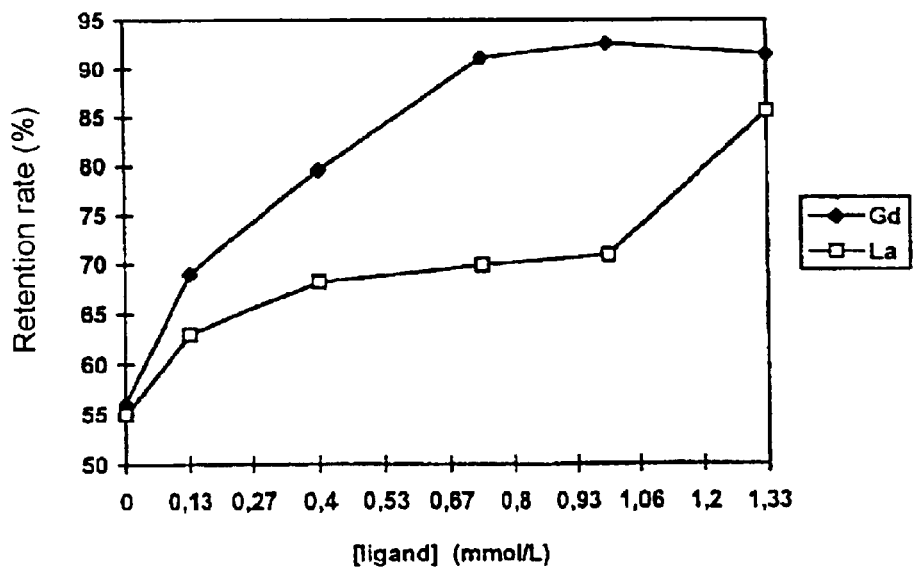

The results of the experiments are given in FIG. 5.

The results in FIG. 5 show that the retention rate of gadolinium is greater than that of lanthanum as soon as complexing agent (2) is added to the solution to be treated. The difference between the retention rate of gadolinium and that of lanthanum is a maximum when the total concentration of complexing agent (2) is 0.7 mmol/l. This difference then has a value of 21%.

Example 9

This Example deals with an aqueous solution containing 2 mmol/l of gadolinium (Gd) and 2 mmol/l of lanthanum (La) in the form of gadolinium and lanthanum nitrate hexahydrates. The filtration module used is a flat module equipped with the SEPA MG-17 membrane (which has a surface area A of 0.015 m) The SEPA MG-17 flat membrane has a permeability to double-distilled water of 2.5 $1.h^{-1}.m^{-2}.bar^{-1}$ at 25° C. A complexing agent consisting of DTPA is added to the aqueous solution to be treated.

The Gd/La separation is effected under the following conditions:

transmembrane pressure $\Delta P=0.6$ MPa, temperature=20° C., retentate flow rate=80 l/h, pH=3.8.

Several experiments are carried out with the complexing agent being added at concentrations varying from 0 to 2 equivalents of DTPA units per atom of gadolinium.

Figure 6:
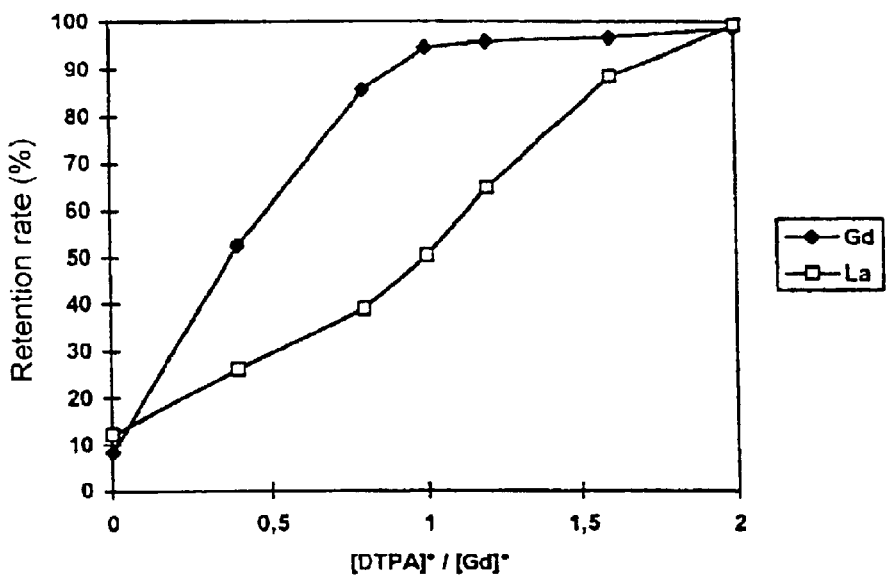
FIG. 6 to 8 are graphs of the retention rate as a function of the ratio concentration of complexing agent/concentration of species to be separated.

The results of the experiments are given in FIG. 6.

The results in FIG. 6 show that the retention rate of gadolinium is greater than that of lanthanum when the solution contains between 0 and 2 equivalents of DTPA units per atom of gadolinium. The difference between the retention rate of gadolinium and that of lanthanum is a maximum when the ratio [complexing agent]/[gadolinium] is equal to 1. This difference then has a value of 45%.

Example 10

This Example deals with an aqueous solution containing 2 mmol/l of gadolinium (Gd) and 2 mmol/l of lanthanum (La) in the form of gadolinium and lanthanum nitrate hexahydrates. The filtration module used is a flat module equipped with the SEPA MG-17 membrane (which has a surface area A of 0.015 m$^2$). The SEPA MG-17 flat membrane has a permeability to double-distilled water of 2.5 $1.h^{-1}.m^{-2}.bar^{-1}$ at 25° C. A complexing agent consisting of (1) of Example 1 is added to the aqueous solution to be treated.

The Gd/La separation is effected under the following conditions:

transmembrane pressure $\Delta P=0.6$ MPa, temperature=20° C., retentate flow rate=80 l/h, pH=3.8.

Several experiments are carried out with the complexing agent being added at concentrations varying from 0 to 2 equivalents of complexing units (1) per atom of gadolinium.

Figure 7:
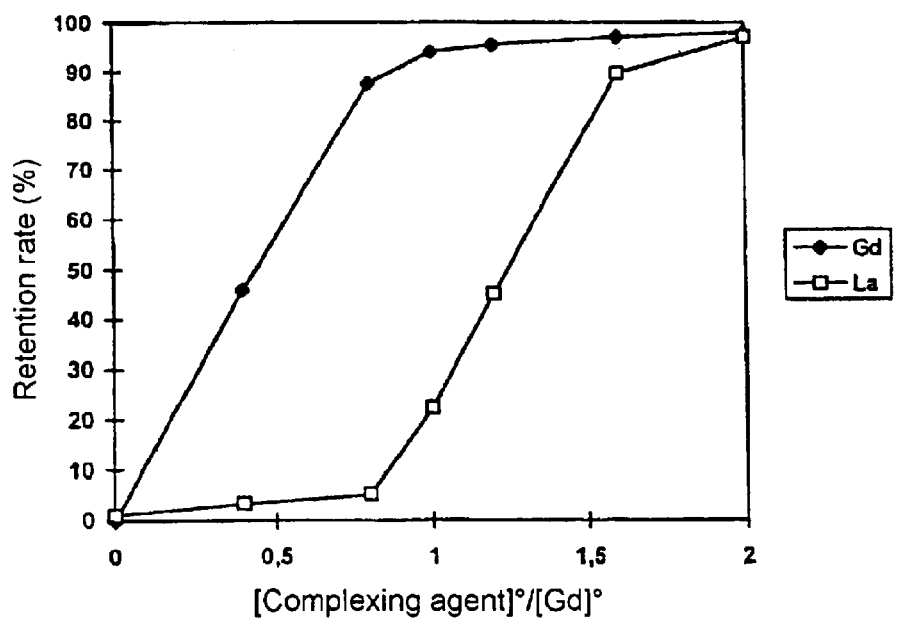

The results of the experiments are given in FIG. 7.

The results in FIG. 7 show that the retention rate of gadolinium is greater than that of lanthanum when the solution contains between 0 and 2 equivalents of complexing units (1) per atom of gadolinium. The difference between the retention rate of gadolinium and that of lanthanum is a maximum when the ratio [complexing agent]/[gadolinium] is equal to 0.8. This difference then has a value of 82%.

Example 11

This Example deals with an aqueous solution containing 2 mmol/l of lanthanum (La) and 2 mmol/l of uranyl ($UO_2$) in the form of lanthanum and uranyl nitrate hexahydrates. The filtration module used is a flat module equipped with the SEPA MG-17 membrane (which has a surface area A of 0.015 m$^2$). The SEPA MG-17 flat membrane has a permeability to double-distilled water of 2.5 $1.h^{-1}.m^{-2}.bar^{-1}$ at 25° C. A complexing agent consisting of (1) of Example 1 is added to the aqueous solution to be treated.

The La/$UO_2$ separation is effected under the following conditions:

transmembrane pressure $\Delta P=0.6$ MPa, temperature=20° C., retentate flow rate=80 l/h, pH=3.8.

Several experiments are carried out with the complexing agent being added at concentrations varying from 0 to 2 equivalents of complexing units (1) per atom of lanthanum.

Figure 8:
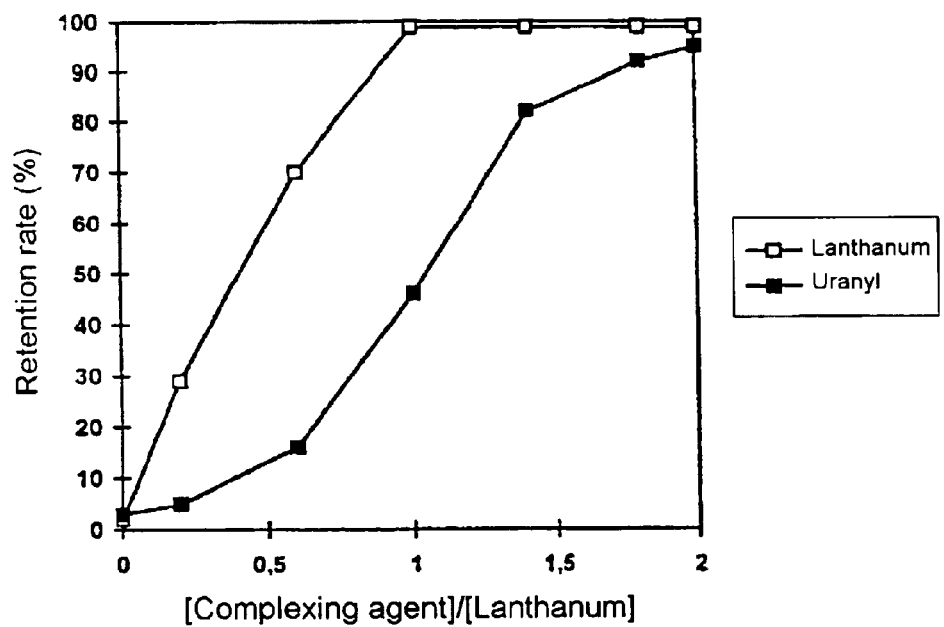

The results of the experiments are given in FIG. 8.

The results in FIG. 8 show that the retention rate of lanthanum is greater than that of uranyl when the solution contains between 0 and 2 equivalents of complexing units (1) per atom of lanthanum. The difference between the retention rate of lanthanum and that of uranyl is a maximum when the ratio [complexing agent]/[lanthanum] is equal to 1. This difference than has a value of 54%.

Example 12

This Example deals with an aqueous solution containing 1 mmol/l of lanthanum (La) and 36 mmol/l of americium ($^{241}$Am), i.e. a molar ratio [La]/[Am] of 27,777. The filtration module used is a flat module equipped with the SEPA MG-17 membrane (which has a surface area A of 0.015 m$^2$). The SEPA MG-17 flat membrane has a permeability to double-distilled water of 2.5 $1.h^{-1}.m^{-2}.bar^{-1}$ at 25° C. A complexing agent consisting of (1) of Example 1 is added to the aqueous solution to be treated.

The La/Am separation is effected under the following conditions:

transmembrane pressure $\Delta P=0.35$ MPa, temperature=38° C., retentate flow rate=200 l/h, pH=3.8.

Several experiments are carried out with the complexing agent being added at concentrations varying from 0 to 33.3 equivalents of complexing units (1) per atom of americium.

The results of the experiments are given in the Table below:

| Concentration of ligand (nmol/l) | 0 | 120 | 1200 |
|---|---|---|---|
| Ratio [ligand]/[Am] | 0 | 3.3 | 33.3 |
| [La] in permeate (mg/l) | 123.6 | 125 | 129.4 |
| [Am] in permeate (kBq/l) | 1100 | 900 | 650 |

The americium 241 was determined by alpha spectrometry. The lanthanum was determined by ICP-AES. The results in the above Table show that the concentration of americium in the permeate fractions decreases when the ligand (1) is added. When the ratio [complexing agent]/[americium] is equal to 33.3, the retention rate of americium has a value of 41%.

This Example shows that, by adding complexing agent (1), it is possible greatly to increase the americium retention without appreciably influencing the lanthanum retention. According to these data, a ratio [ligand]/[Am] in the order of 500 would be necessary to obtain an americium retention of 92% without appreciably affecting the lanthanum retention (lanthanum retention below 2%).

What is claimed is:

1. Process for separating lanthanides from one another and/or lanthanides from actinides and/or actinides from one another and/or from other transition metals in an aqueous medium, comprising the steps of:

a) treating of the aqueous medium with at least one ligand selected from the group consisting of ethylenediaminetetraacetic acid, linear polyamino acids and cyclic polyamino acids;

b) (nano)filtering the aqueous solution treated with the at least one ligand through a membrane, under a transmembrane pressure greater than or equal to 0.01 MPa, so as to collect a retentate enriched in at least one species of lanthanide, actinide or other transition metal which is at least partially complexed with the ligand, and a permeate impoverished in said species; and c) optionally recovering the ligand/species complexes to be separated from the retentate, and treating the complexes with at least one decomplexing agent so as to separate the at least one ligand from the species.

2. Process according to claim 1, wherein the at least one ligand is a linear polyamino acid of formula (I):

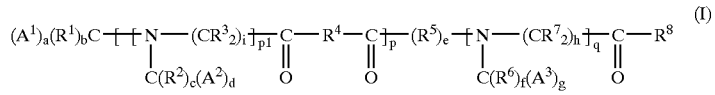

in which:

a=0 or 1 and b=2 or 3;

c=2 or 3 and d=0 or 1;

p=0 to 3;

p1=1 to 4;

e=0 or 1;

q=1 to 4;

f=2 or 3 and g=0 or 1;

h and i, which are identical or different, are each 1, 2 or 3;

$A^1$, $A^2$ and $A^3$ are identical to or different from one another and correspond to a monovalent acid group selected from the group consisting of:

—COOR, —PO$_3$R' and —SO$_3$R", where R, R', R"=H or a cation;

the radicals $R_1$ are identical to or different from one another and correspond to:

$\Delta C_1$–$C_{10}$ alkyl or

where a=0 and $R^9$ and $R^{10}$ are identical or different and each correspond to hydrogen or a hydrophilic monovalent radical selected from the group consisting of amino, (poly) hydroxylated, alkoxylated and (poly)etherified hydrocarbon radicals of the (cyclo)alkyl, aralkyl, alkylaryl, (cyclo) alkenyl, aralkenyl, alkenylaryl or aryl type, and mixtures thereof;

the radicals $R^2$ are identical to or different from one another;

the radicals $R^3$ are identical to or different from one another;

the radicals $R^6$ are identical to or different from one another;

the radicals $R^7$ are identical to or different from one another, $R^2$, $R^3$, $R^6$ and $R^7$ being identical to or different from one another and corresponding to H or a $C_1$–$C_{10}$ alkyl;

the radicals $R^4$ are identical to or different from one another and correspond to a hydrophilic divalent group selected from the group consisting of aromatic amino groups, hydroxylated groups, aromatic and alkyl amino and/or hydroxylated groups, aromatic and (cyclo) alkylenic amino and/or hydroxylated groups and (cyclo)alkylenic amino and/or hydroxylated groups, said groups optionally containing alkoxy and/or (poly) ether radicals, the divalent group $R^5$ is an alkylene group or a group having the same definition as $R^4$; or the group $R^8$ corresponds to a hydroxyl, to $A^4$ having the same definition as $A^1$, $A^2$ and $A^3$, to hydrogen or to —NR$^9$R$^{10}$, where $R^9$ and $R^{10}$ are identical to or different from one another and are a hydrophilic monovalent radical selected from the group consisting of amino, (poly)hydroxylated, alkoxylated and (poly) etherified hydrocarbon radicals and mixtures thereof, the hydrocarbon radicals being of the (cyclo)alkyl, aralkyl, alkylaryl, (cyclo)alkenyl, aralkenyl, alkenylaryl or aryl type.

3. Process according to claim 2, wherein $R^9$ and $R^{10}$ each corresponds to a $C_1$–$C_{10}$ hydroxyalkyl, a $C_1$–$C_{10}$ alkoxy or a polyol.

4. Process according to claim 3, wherein the polyol is a hydrogenated saccharide.

5. Process according to claim 2, wherein $R^4$ is a group

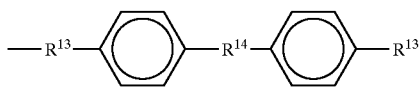

where $R^{13}$ is an amino group and $R^{14}$ is a $C_1$-$C_4$ alkylene.

6. Process according to claim 2, wherein $R^8$ is a $C_1$—$C_{10}$ hydroxyalkyl, a $C_1$—$C_{10}$ alkoxy or a polyol.

7. Process according to claim 6, wherein the polyol is a hydrogenated saccharide.

8. Process according to claim 1, wherein the transmembrane pressure is greater than or equal to 0.1 MPa.

9. Process according to claim 8, wherein the transmembrane pressure is between 0.2 and 1.0 MPa.

10. Process according to claim 1, wherein the ions of the metal(s) to be separated are subjected to selective complexation.

11. Process according to claim 1, wherein the at least one ligand has a molecular weight which is greater than a known cut-off threshold of the nanofiltration membrane.

12. Process according to claim 1, wherein the at least one ligand is of formula (I.1):

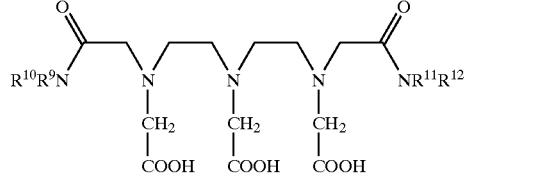

in which $R^9$, $R^{10}$, $R^{11}$ and $R^{12}$ are identical to or different from one another and each is a hydrophilic monovalent radical.

13. Process according to claim 12 wherein the hydrophilic monovalent radicals are selected from the group consisting of ethanoyl, methoxyethyl and sorbitoyl radicals.

14. Process according to claim 1, wherein several metal species belonging to the lanthanide and/or actinide family are separated, said separation being effected by successive complexations of the ions of each of these species to be separated, a selective ligand being chosen for each species in step a), a nanofiltration in step b) and a decomplexation/collection in step c) being carried out after each complexation.

15. Process according to claim 1, wherein the nanofiltration membrane is made of at least one material selected from the group of polymers consisting of polyaramides, sulfonated polysulfones, polybenzimidazolones, grafted or non-grafted polyvinyldidene fluorides, polyamides, cellulose esters, cellulose ethers, perfluorinated ionomers, associations of these polymers, and copolymers obtained from monomers of at least two of these polymers.

16. Process according to claim 1, wherein the nanofiltration membrane has a cut-off threshold of 100–5000 g/mol.

17. Process according to claim 16, wherein the cut-off threshold is 200–2000 g/mol.

18. Process according to claim 17, wherein the cut-off threshold is 500–1500 g/mol.

19. Process according to claim 1, wherein said treating takes place in an aqueous medium at a pH between 1 and 6.

20. Process according to claim 1, wherein the aqueous medium treated is derived from spent nuclear fuel.

21. A complexing agents having one of the formulae:

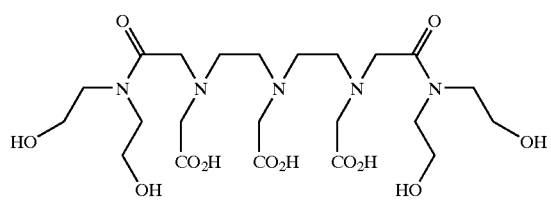

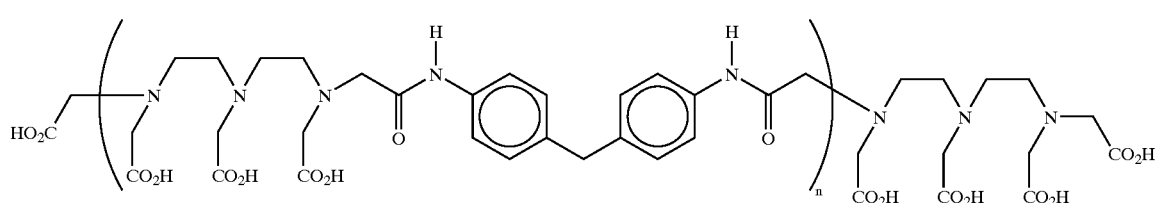

n being between 1 and 100, and

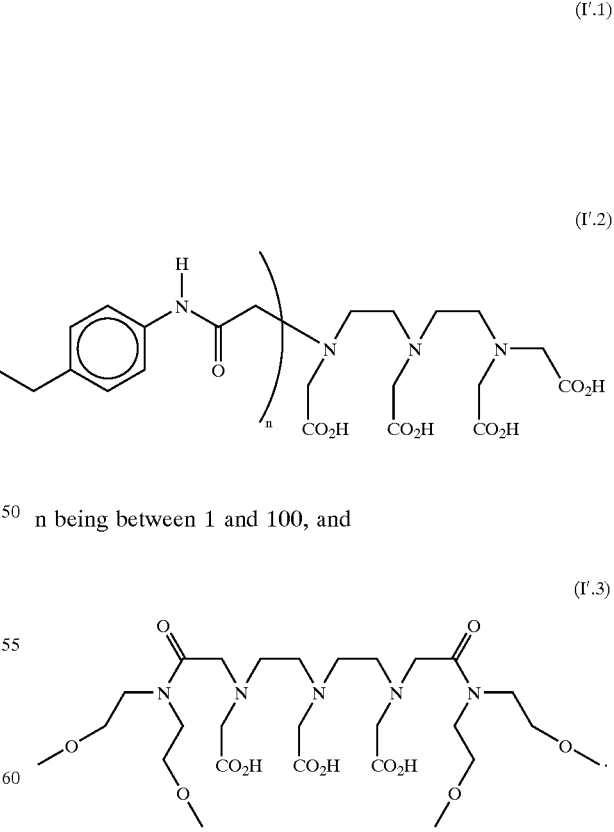

22. Complexing agent according to claim 21, of formula (I'.2) wherein n is between 1 and 10.

* * * * *